(12) United States Patent
Arendt et al.

(10) Patent No.: US 7,568,753 B2
(45) Date of Patent: Aug. 4, 2009

(54) CHILDREN'S RIDE-ON VEHICLES WITH RECONFIGURED BODIES AND METHODS FOR FORMING THE SAME

(75) Inventors: Albert L. Arendt, West Seneca, NY (US); John L. Jones, Jr., East Aurora, NY (US); Michael B. Zielinski, West Seneca, NY (US)

(73) Assignee: Mattel, Inc., El Segundo, CA (US)

( * ) Notice: Subject to any disclaimer, the term of this patent is extended or adjusted under 35 U.S.C. 154(b) by 34 days.

(21) Appl. No.: 11/784,861

(22) Filed: Apr. 9, 2007

(65) Prior Publication Data

US 2007/0290497 A1  Dec. 20, 2007

Related U.S. Application Data

(60) Provisional application No. 60/814,486, filed on Jun. 15, 2006.

(51) Int. Cl.
*A63H 17/00* (2006.01)
(52) U.S. Cl. .............. 296/177; 296/181.2; 446/470
(58) Field of Classification Search ............ 296/181.2, 296/181.4, 37.4, 97.21, 177; 280/827, 828, 280/1.186; 446/470
See application file for complete search history.

(56) References Cited

U.S. PATENT DOCUMENTS

| | | | |
|---|---|---|---|
| 2,973,220 A | 2/1961 | White | |
| RE25,382 E * | 5/1963 | Douglas | 296/177 |
| 3,596,979 A | 8/1971 | Hablitzel et al. | |
| 3,632,156 A | 1/1972 | Schweser | |
| 4,709,958 A | 12/1987 | Harrod | |
| 4,988,143 A | 1/1991 | Harrod | |
| RE33,769 E | 12/1991 | Harrod | |
| 5,228,742 A | 7/1993 | Johnson et al. | |
| 5,294,153 A | 3/1994 | Nolan | |
| 5,667,868 A | 9/1997 | Freeman | |
| 5,954,389 A | 9/1999 | Ringdal et al. | |
| 6,918,171 B2 | 7/2005 | Kucera et al. | |
| 6,918,627 B2 | 7/2005 | Mataja et al. | |
| 7,354,082 B2 * | 4/2008 | Sakamoto et al. | 293/115 |
| 2004/0194282 A1 | 10/2004 | Kucera et al. | |
| 2005/0161979 A1 | 7/2005 | Chernoff et al. | |

\* cited by examiner

*Primary Examiner*—Jason S Morrow
(74) *Attorney, Agent, or Firm*—Dascenzo Intellectual Property Law, P.C.

(57) ABSTRACT

Children's ride-on vehicles with reconfigured, or flexed panel, bodies. The bodies include at least one reconfigured, or flexed, body panel that is retained in a biased, or flexed, configuration and/or against its internal bias to move from the flexed configuration. In some embodiments, the body has an exterior shape that is determined at least in part by the at least one flexed body panel. In some embodiments, the at least one body panel is integrally formed with other portions of the ride-on's body, and in some embodiments, a portion of the body panel remains in an unflexed configuration when another portion of the body panel is retained in the flexed configuration. In some embodiments, the vehicles include at least one retainer that engages a flexed panel and retains the panel in a defined position relative to another portion of the ride-on's body.

20 Claims, 5 Drawing Sheets

CHILDREN'S RIDE-ON VEHICLES WITH RECONFIGURED BODIES AND METHODS FOR FORMING THE SAME

CROSS-REFERENCE TO PRIORITY APPLICATION

This application claims priority under 35 U.S.C. § 119(e) to U.S. Provisional Patent Application Ser. No. 60/814,486, filed Jun. 15, 2006, which is incorporated herein by reference in its entirety for all purposes.

FIELD OF THE DISCLOSURE

The present disclosure relates to children's ride-on vehicles, and more particularly to body constructions for children's ride-on vehicles and methods for producing the same.

BACKGROUND OF THE DISCLOSURE

Children's ride-on vehicles are reduced-scale vehicles sized and configured to be operated by children. The vehicles may be motorized vehicles, which may be powered by one or more battery-powered motors. Alternatively, the vehicles may be manually powered vehicles, which may be pedal-powered or powered by a child pushing the child's feet against a ground surface. A ride-on vehicle is steered by a child operating the vehicle's steering assembly through movement of a handlebar, steering wheel, or other steering mechanism. Movements of the steering mechanism are conveyed as steering inputs through a steering column to one or more of the vehicle's wheels.

Children's ride-on vehicles often are designed to resemble full-sized vehicles, such as vehicles that are normally driven by adults. However, the bodies of children's ride-on vehicles are typically formed by an injection molding, or similar, process. This molding process imposes design constraints on the shape and appearance of the vehicle bodies. For example, when using two-part, or similar monolithic mold portions, the shape of the produced mold body may be limited by undercut concerns. Undercut refers to the fact that the mold halves, or portions, must be able to be separated from the molded body, or other molded portion of the ride-on, without damaging the molded body as the mold portions are drawn away from each other. For example, if a body includes portions that are concave or convex in a direction normal to the axis in which the mold half is drawn away from the, molded body after the molding process, the removal of the mold half may impinge upon or otherwise engage the body portion, which may result in damage to the body, such as if the concave or convex region exceeds a threshold depth. Conventionally, undercut limitations have limited the realism of molded ride-on bodies and/or required more complex molds and/or assembly of the bodies from an increased number of components.

SUMMARY OF THE DISCLOSURE

The present disclosure is directed to children's ride-on vehicles having reduced-scale molded bodies, such as molded plastic bodies, that define a passenger region sized for a child. The bodies have at least one reconfigured, or flexed, body panel that is retained in a biased, or flexed, configuration and/or against its internal bias to move from the flexed configuration. In some embodiments, the body has an exterior shape that is determined at least in part by the at least one flexed body panel. In some embodiments, the at least one body panel is integrally formed with other portions of the ride-on's body, and in some embodiments, a portion of the body panel remains in an unflexed configuration when another portion of the body panel is retained in the flexed configuration. In some embodiments, the unflexed configuration is a flared configuration in which the body panel is biased to extend generally away from the region it occupies when in its flexed configuration and/or generally away from the passenger region of the ride-on. In some embodiments, the body panel is flexed through an angle of at least 5°, such as an angle in the range of 5-90°, from an unflexed configuration to the flexed configuration. In some embodiments, the body includes at least a pair of flexed body panels, such as a pair of generally opposed body panels. In some embodiments, the body panels are side panels. In some embodiments, the body panels include a lower region and the vehicles include at least one retainer that engages the lower portion of the body panel and retains the lower portion in a defined position relative to a bottom portion of the ride-on's body.

The ride-on vehicles include a plurality of wheels, which include at least one steerable wheel and which may include at least one driven wheel. The vehicles further include a steering assembly with a steering mechanism that is operably coupled to the at least one steerable wheel and which is configured to steer the at least one steerable wheel responsive to steering inputs received from a child sitting in the passenger region. In some embodiments, the ride-on vehicles are battery-powered vehicles having drive assemblies with battery-powered motor assemblies. In other embodiments, the vehicles have manually powered drive assemblies that are manually powered by a child rider, such as by a child pedaling a pedal assembly that is coupled to at least one of the ride-on's wheels and/or by a child propelling the ride-on by pressing against a ground surface with the child's feet.

DETAILED DESCRIPTION AND BEST MODE OF THE DISCLOSURE

Figure 1:
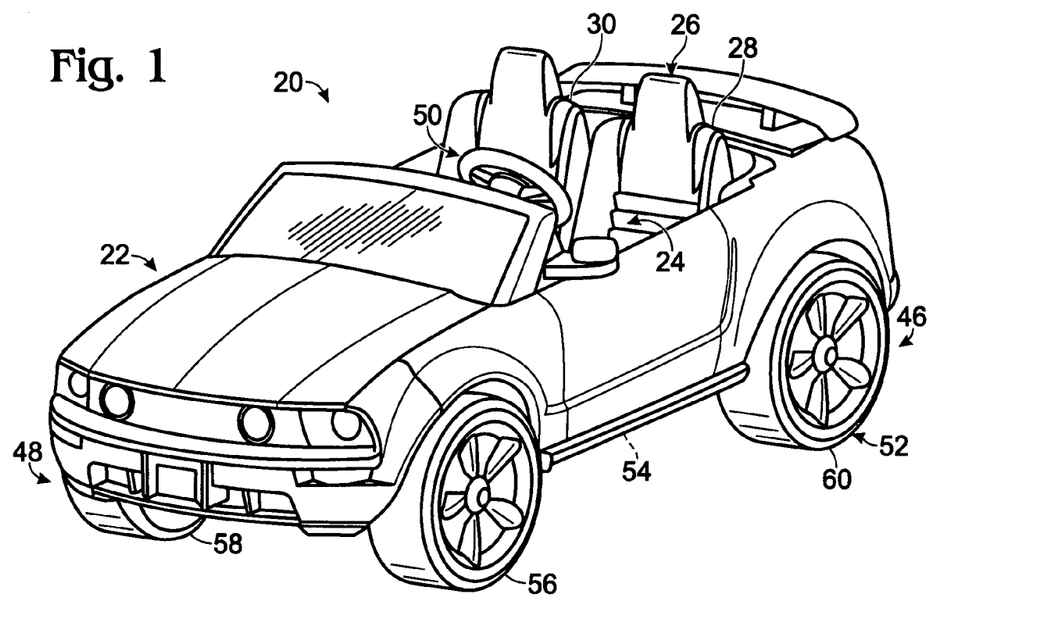
FIG. 1 is an isometric view of an illustrative, non-exclusive example of a children's ride-on vehicle that includes a reconfigured body, in accordance with aspects of the present disclosure.
Figure 2:
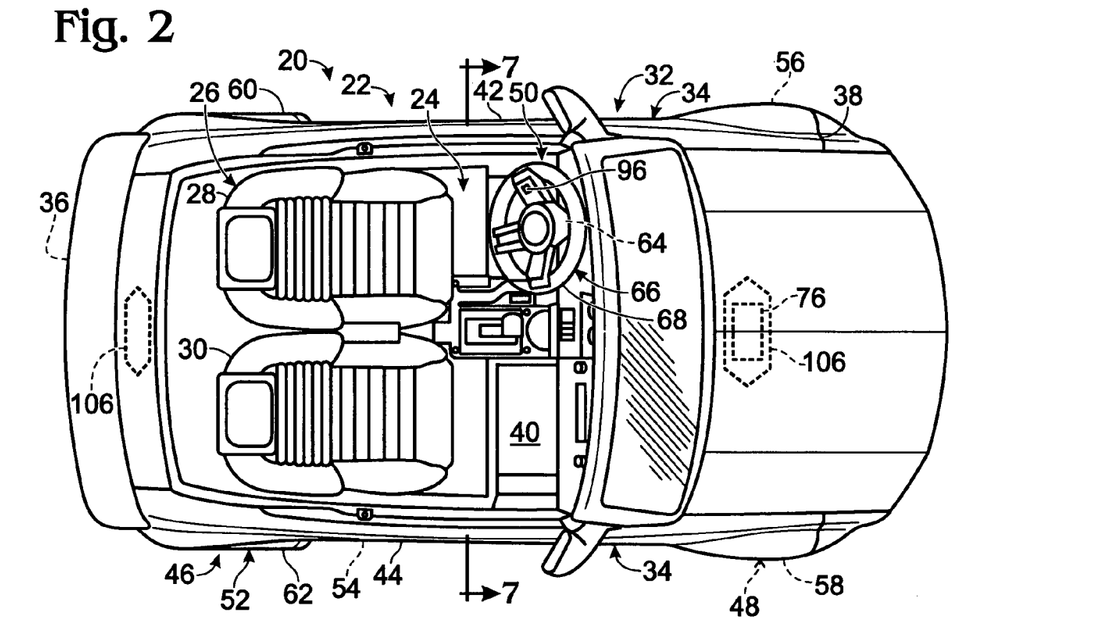
FIG. 2 is a plan view of the children's ride-on vehicle of FIG. 1.

An illustrative, non-exclusive example of a children's ride-on vehicle with a reconfigured body according to the present disclosure is shown in FIGS. 1 and 2 and is indicated generally at 20. Ride-on vehicle 20 includes a reconfigured body 22 that defines, or defines at least a substantial portion of, a passenger region, or passenger compartment, 24. The compartment may include a seat assembly 26 that is sized and configured to accommodate at least one child, including a child driver. Seat assembly 26 may be integral with or otherwise mounted on body 22 and may have any suitable configuration, including configurations in which the position of the seat assembly is adjustable within the passenger compartment, and configurations in which the seat assembly includes only one seat, two or more seats, or two or more seating regions, among others. Typically, vehicle 20 will be sized for use by a child driver or by a child driver and a child passenger. For example, in the illustrated embodiment, seat assembly 26 includes a pair of seats, or seating regions, 28 and 30, with seat 28 sized and positioned to receive a child driver and seat 30 sized and positioned to receive a child passenger.

Body 22 typically is formed from molded plastic and may be integrally formed or formed from a plurality of parts that are secured together by fasteners (such as screws, bolts, clips, etc.), via engaged mating structures (e.g., tabs received in slots), with an adhesive, and/or by bonding, among others. Body 22 may additionally, or alternatively, be at least partially formed from any other suitable material(s), such as metal, wood, or composite materials. Body 22 may include, or be mounted upon, an underlying chassis, or chassis portion. In such an embodiment, the chassis may be formed from the same or different materials as the rest of the body. In some embodiments, the body may include a monolithic portion having front, rear, bottom, and opposed side regions, or panels, that define, or at least substantially define, the passenger region of the children's ride-on vehicle. This is graphically illustrated in FIG. 2, in which body 22 is depicted as including a monolithic portion 32 that includes body portions 34 that include a rear portion 36, a front portion 38, a bottom portion 40, and generally opposed side portions 42, 44. One or more of the body portions may be referred to as being, or including, a body panel and may be embodied as a reconfigured, or flexed, body panel within the scope of the present disclosure.

As shown, body 22 is shaped to generally resemble a reduced-scale Ford® Mustang® vehicle. Ford® and Mustang® are registered trademarks of the Ford Motor Company, and the Ford® and Mustang® marks and designs are used by permission. In other embodiments, children's ride-on vehicles with reconfigured bodies may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft, and the like. The reduced-scale vehicles may resemble a generic full-sized vehicle or a particular make and/or model of a full-sized vehicle. However, it is also within the scope of the present disclosure that vehicle 20 may be shaped to resemble fantasy vehicles that do not have a corresponding adult-sized counterpart. Although vehicle 20 is depicted in the form of a reduced-scale Ford® Mustang® vehicle, it will be appreciated that any of the components and/or features of vehicle 20 may be configured for use on any type of children's ride-on vehicle.

Children's ride-on vehicle 20 also includes a plurality of wheels 46 that are rotatably coupled to body 22, as indicated in FIGS. 1 and 2. The plurality of wheels includes a steerable wheel assembly 48 that contains at least one steerable wheel that is adapted to be steered by the vehicle's steering assembly 50, typically at least partially in response to user-imparted steering inputs thereto. The plurality of wheels may further include a driven wheel assembly, such as indicated at 52, that contains at least one driven wheel that is adapted to be rotationally driven by the vehicle's drive assembly 54. As used herein, the term "driven wheel" refers to a wheel that is rotated in response to a rotational input from the vehicle's drive assembly, which is either directly conveyed to the wheel by the output of a motor assembly or conveyed through a linkage, such as a gearbox, belt, chain, gear assembly, axle, or the like.

In the illustrated embodiment, vehicle 20 includes four wheels 46, with front wheels 56 and 58 forming steerable wheel assembly 48, and rear wheels 60 and 62 forming driven wheel assembly 52. The number of wheels on the vehicle may vary from two wheels to three, four, five, six or more wheels. However, children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 56 and 58 or rear wheels 60 and 62 are driven and steerable. Similarly, one front wheel and one rear wheel may be driven and/or steerable, and/or the vehicle may include one or more driven or steerable wheels underneath its body that are generally hidden by the body of the vehicle.

A portion of the vehicle's steering assembly 50 is shown in FIG. 2 and includes a steering column 64 and a steering mechanism 66. The steering assembly enables a child sitting on seat 28 to steer the vehicle's steerable wheel assembly 48 via user-applied steering inputs to steering mechanism 66, which is positioned on vehicle 20 for operation by a child sitting on seat 28. In the illustrated embodiment, steering mechanism 66 takes the form of a steering wheel 68. Other suitable structures, such as handlebars and steering levers, may be used. Steering column 64 includes any suitable mechanical linkage that conveys a child's steering inputs from the steering mechanism to the vehicle's steerable wheel assembly, thereby steering the vehicle.

Figures 3, 4:
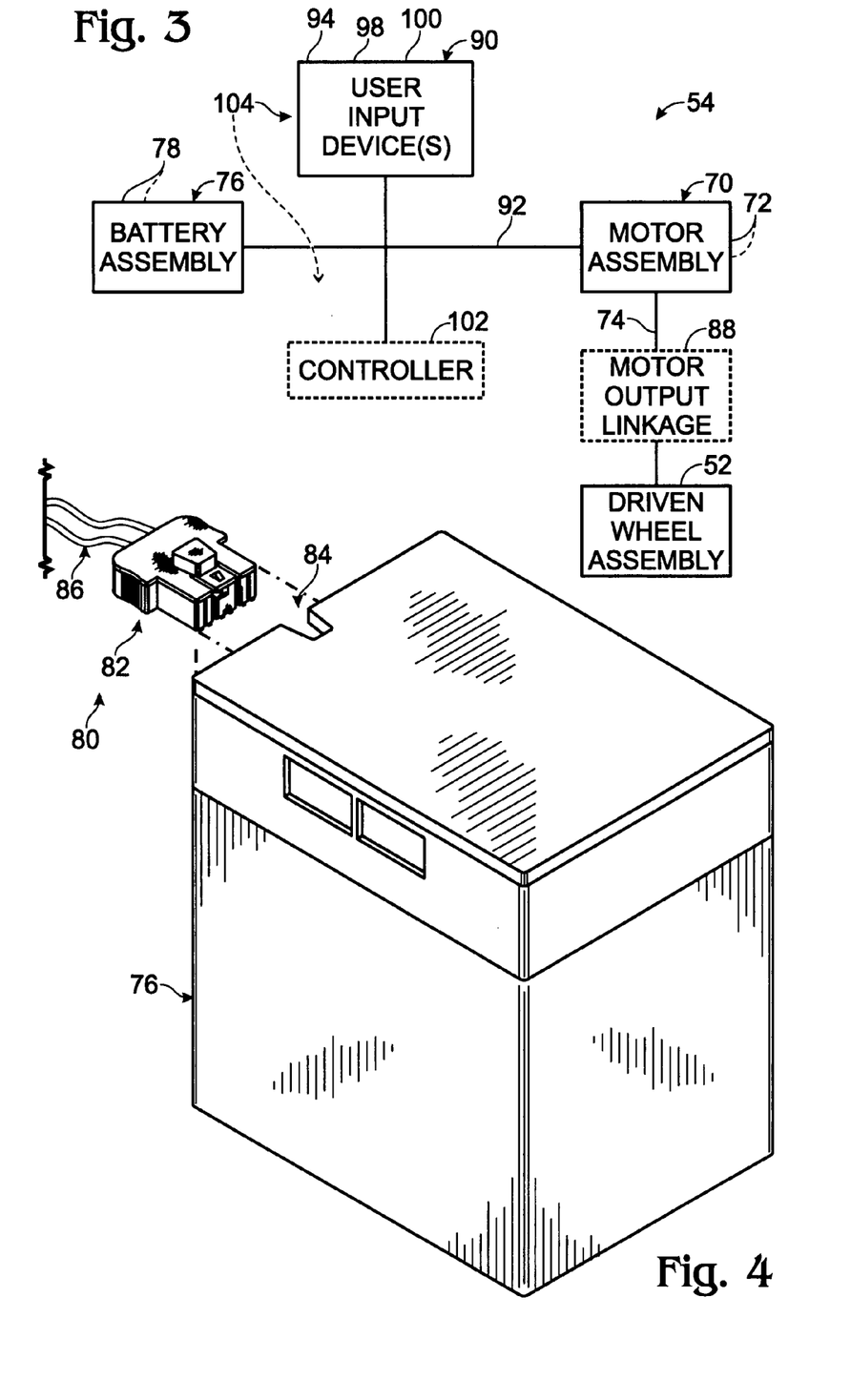
FIG. 3 is a schematic diagram of an illustrative, non-exclusive example of a suitable drive assembly for a children's ride-on vehicle having a reconfigured body, in accordance with aspects of the present disclosure.
FIG. 4 is an isometric view of an illustrative, non-exclusive example of a suitable battery assembly for the drive assembly of FIG. 3, with portions of a wiring harness and charging assembly shown in fragmentary view, in accordance with aspects of the present disclosure.

FIG. 3 shows a schematic diagram of an illustrative, non-exclusive example of a suitable drive assembly 54 for a children's ride-on vehicle, such as vehicle 20. Drive assembly 54 is adapted to drive the rotation of driven wheel assembly 52 (see FIGS. 1 and 2). In FIG. 3, drive assembly 54 is illustrated as a motorized drive assembly that includes a motor assembly 70, which includes at least one battery-powered motor 72 that is adapted to drive the rotation of at least one of the plurality of wheels. The motor assembly 70 includes an output 74 that provides a rotational input to the driven wheel assembly 52. Typically, output 74 from each of the at least one motors includes a rotating shaft and/or a rotation pinion or output gear. Output 74 may include more than one shaft, pinion, and/or gear, such as when motor assembly 70 includes more than one motor and/or when the driven wheel assembly includes more than one driven wheel. Motor assembly 70 may also be configured to power other moveable components on vehicle 20, depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Power for the motor assembly may be provided by battery assembly 76. Battery assembly 76 may include at least one battery, or cell, 78 that is adapted to provide power to the motor assembly. The one or more batteries in battery assembly 76 may have any suitable construction, and in some embodiments may be rechargeable batteries. Some rechargeable batteries may be designed to be selectively disconnected from the motor assembly and connected to a charging assembly to recharge the batteries. Other rechargeable batteries are configured to be recharged without being disconnected from the motor assembly. Any suitable type and number of batteries, or cells, may be used in battery assembly 76. For example, one or more six-, twelve-, eighteen-, or twenty-four-volt batteries have proven effective. An illustrative example of a battery assembly 76 is shown in FIG. 4. Also shown in FIG. 4 is a connector assembly 80 to transmit power from the battery assembly to the motor assembly. Thus, motor assembly 70 (see FIG. 3) is operably connected to battery assembly 76 by any suitable electrical connectors, such as cables, wires, positive and negative terminals or leads, and/or the like. In the illustrative example of a battery assembly shown generally in FIG. 4, connector assembly 80 includes a plug 82 that fits into a socket 84 that is electrically connected to battery assembly 76. Plug 82 connects to wires, or electrical cables, 86 that transmit electrical power from battery assembly 76 to motor assembly 70 and thereby form a portion of the wiring harness of the vehicle's drive assembly 54 (see FIG. 3). In some instances, vehicle 20 may include any other suitable structure for conducting electrical power from battery assembly 76 to motor assembly 70, with connector assembly 80 of FIG. 4 merely providing an illustrative example. For example, the battery assembly may include an electrical connector, such as a plug or socket, that extends from the housing of the battery assembly and is electrically connected thereto by lengths of wires.

In FIG. 3, drive assembly 54 is shown further including an optional motor output linkage 88 that mechanically interconnects motor assembly 70 with driven wheel assembly 52. Motor output linkage 88 is any suitable mechanism that transmits rotational input from the motor assembly's output(s) to driven wheel assembly 52. Examples of suitable linkages include an intermediate linkage between output 74 of motor assembly 70 and driven wheel assembly 52, such as a gearbox containing one or more gears, a belt or chain drive, a worm gear, one or more individual gears, and/or the like. Motor output linkage 88 may be adapted to transmit rotational input from output 74 to driven wheel assembly 52 at the same relative rate of rotation, or it may mechanically augment the rotational input to convey a greater or lesser rate of rotation relative to the rate of rotation of output 74. In some cases, drive assembly 54 may be formed without motor output linkage 88, such that rotational input from the output(s) of motor assembly 70 may be transmitted directly to driven wheel assembly 52.

Drive assembly 54 also includes one or more user input devices 90 that are adapted to convey inputs from a child sitting on seat 28 to the drive assembly. User input devices 90 also may be referred to as user control devices. These devices convey a user's inputs, such as via the vehicle's wiring harness 92, and control the actuation of motor assembly 70, such as by causing the actuation (or energization) of the motor assembly, selecting between a range of electronic configurations, selecting the direction of rotation of the motor assembly's output 74, selecting the relative degree to which the motor assembly is actuated, etc. Examples of suitable devices 90 include a drive actuator 94, through which a user input directing battery assembly 76 to energize motor assembly 70 is received. Examples of suitable drive actuators 94 include an on/off switch, a foot pedal, a throttle lever, and a rotational handgrip on a steering mechanism that includes a handlebar. In vehicle 20, and as shown in FIG. 2, drive actuator 94 takes the illustrative, non-exclusive form of a foot pedal positioned for actuation by a child sitting on seat 28. When drive actuator 94 takes a form other than a foot pedal, it may be located in any suitable location within or near passenger compartment 24 so that a child sitting on seat 28 may reach the actuator while positioned to operate vehicle 20. For example, an on/off switch or throttle may be located on the body or on steering mechanism 66, such as illustrated at 96 in FIG. 2.

As schematically illustrated in FIG. 3, other illustrative, non-exclusive examples of user input devices 90 include a speed switch 98, which enables a user to select the relative rate of rotation of the motor assembly's output 74, and a direction switch 100, which enables a user to select the relative direction (i.e., clockwise or counterclockwise) of rotation of output 74 and thereby configure vehicle 20 to drive in forward and reverse directions. When present, switches 98 and 100 may be located in any suitable location on body 22 or steering assembly 50 for actuation by a child sitting on seat 28. An example of a suitable speed switch 98 is a switch that selectively switches a pair of batteries between series and parallel configurations to define relative "high" and "low" speed configurations. Speed switch 98 may additionally or alternatively selectively switch a pair of motors between series and parallel configurations. As a further example, the switches may convey inputs to a controller, such as subsequently described controller 102, which, responsive to inputs from the switches, configures vehicle 20 for a selected operating state.

As illustrated in FIG. 3, drive assembly 54 may (but is not required to) further include controller 102, which is adapted to electronically control the transmission of the rotational input from motor assembly 70 to driven wheel assembly 52. More specifically, controller 102 may include a microprocessor or suitable control circuit that is adapted to control the actuation, or energization, of motor assembly 70 by battery assembly 76 to electronically regulate the rotational input transmitted by motor assembly 70 to driven wheel assembly 52. Controller 102 may regulate at least one of the timing and the ramp, or rate, of application of the transmission of the rotational input after actuation of a corresponding user input device 90 by a child sitting on seat 28. In other words, controller 102 may delay in at least time and/or rate of transmission the rotational input to driven wheel assembly 52 responsive at least in part to a user input selecting the rotational input. An illustrative example of a suitable controller is disclosed in U.S. Pat. No. 6,771,034, the complete disclosure of which is incorporated herein by reference for all purposes. The one or more user input devices 90 (and, when present, controller 102) that are adapted to configure the vehicle's drive assembly 54 between a plurality of operating states may be referred to collectively as the vehicle's speed control assembly 104.

As shown in FIG. 2, body 22 also includes at least one battery compartment 106 that is adapted to receive battery assembly 76. The battery compartment may take any of a variety of different shapes, sizes, and configurations depending on such factors as the form of vehicle 20, the portion of the vehicle's body within which the compartment is formed, and the size and shape of battery assembly 76. FIG. 2 provides graphical illustrations of illustrative, non-exclusive examples of suitable positions for battery compartment 106, that is, toward the front under the hood and/or near the back (behind the passenger compartment). Another illustrative position is under seat assembly 26. The battery compartment may include a cover or other closure to selectively restrict access to the battery assembly during use of the vehicle. The compartment may additionally or alternatively include a suitable retainer to position and/or secure the battery assembly within the battery compartment. Illustrative, non-exclusive examples of suitable battery retainers are disclosed in U.S. Pat. Nos. 6,186,256, 6,347,679, 6,508,322, 6,973,987, and 7,007,767, the complete disclosures of which are hereby incorporated by reference for all purposes.

The previously described drive assembly 54 provides an example of a motorized drive assembly having at least one battery-powered motor. Children's ride-on vehicles with reconfigured bodies according to the present disclosure may additionally or alternatively include a manually powered drive assembly. As an illustrative example, a manually powered drive assembly may include a pedal assembly having pedals that are coupled to at least one of the plurality of wheels so that the at least one wheel is rotatably driven as a child seated in the vehicle passenger compartment moves the pedals. An illustrative example of a suitable pedal assembly is disclosed in U.S. Pat. No. 6,651,528, the complete disclosure of which is incorporated herein by reference for all purposes.

Figures 5, 7:
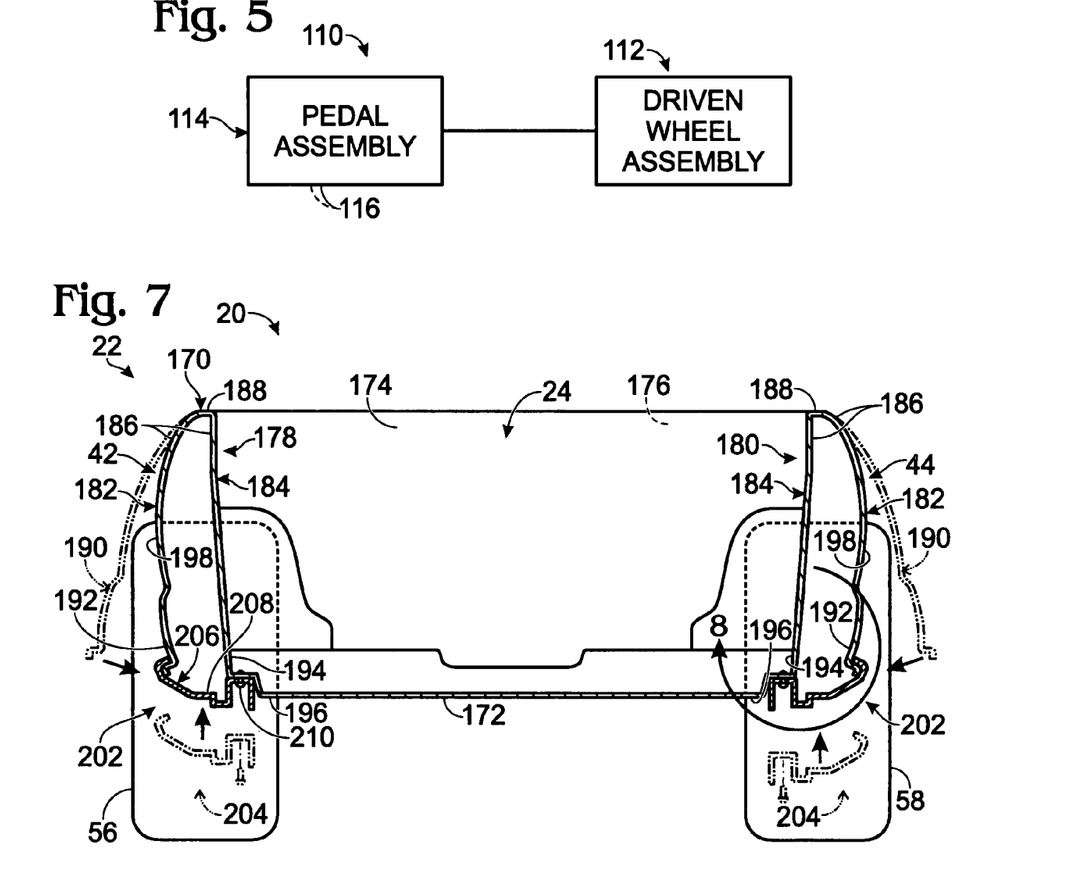
FIG. 5 is a schematic diagram of another illustrative, non-exclusive example of a suitable drive assembly for a children's ride-on vehicle having a reconfigured body, in accordance with aspects of the present disclosure.
FIG. 7 is a somewhat schematic sectional view of selected portions of the children's ride-on vehicle of FIGS. 1 and 2, taken generally along line 7-7 of FIG. 2.

An illustrative, non-exclusive example of a pedal-powered drive assembly 110 for a children's ride-on vehicle is schematically illustrated in FIG. 5. Assembly 110 includes a driven wheel assembly 112 that is operatively coupled to a pedal assembly 114 having pedals 116. Rotation of the pedals drives the rotation of the driven wheel assembly. It is also within the scope of the present disclosure that children's ride-on vehicles having reconfigured bodies may be formed without a drive assembly and therefore may be adapted to be propelled by a child seated on seat 28 pushing the vehicle with the child's feet in a foot-to-floor manner (and/or by coasting downhill), and/or by an adult who pushes the vehicle through any suitable mechanism, among others.

As discussed, children's ride-on vehicles according to the present disclosure include bodies have at least one body portion, or body panel, that is retained in a flexed configuration against its internal bias. Described in slightly different terms, the body panel may be biased or otherwise configured to have a flared or other unflexed configuration, such as after molding of the panel, but during assembly of the ride-on vehicle the panel is bent or otherwise resiliently flexed to a flexed configuration and thereafter retained in this flexed configuration.

Figure 6:
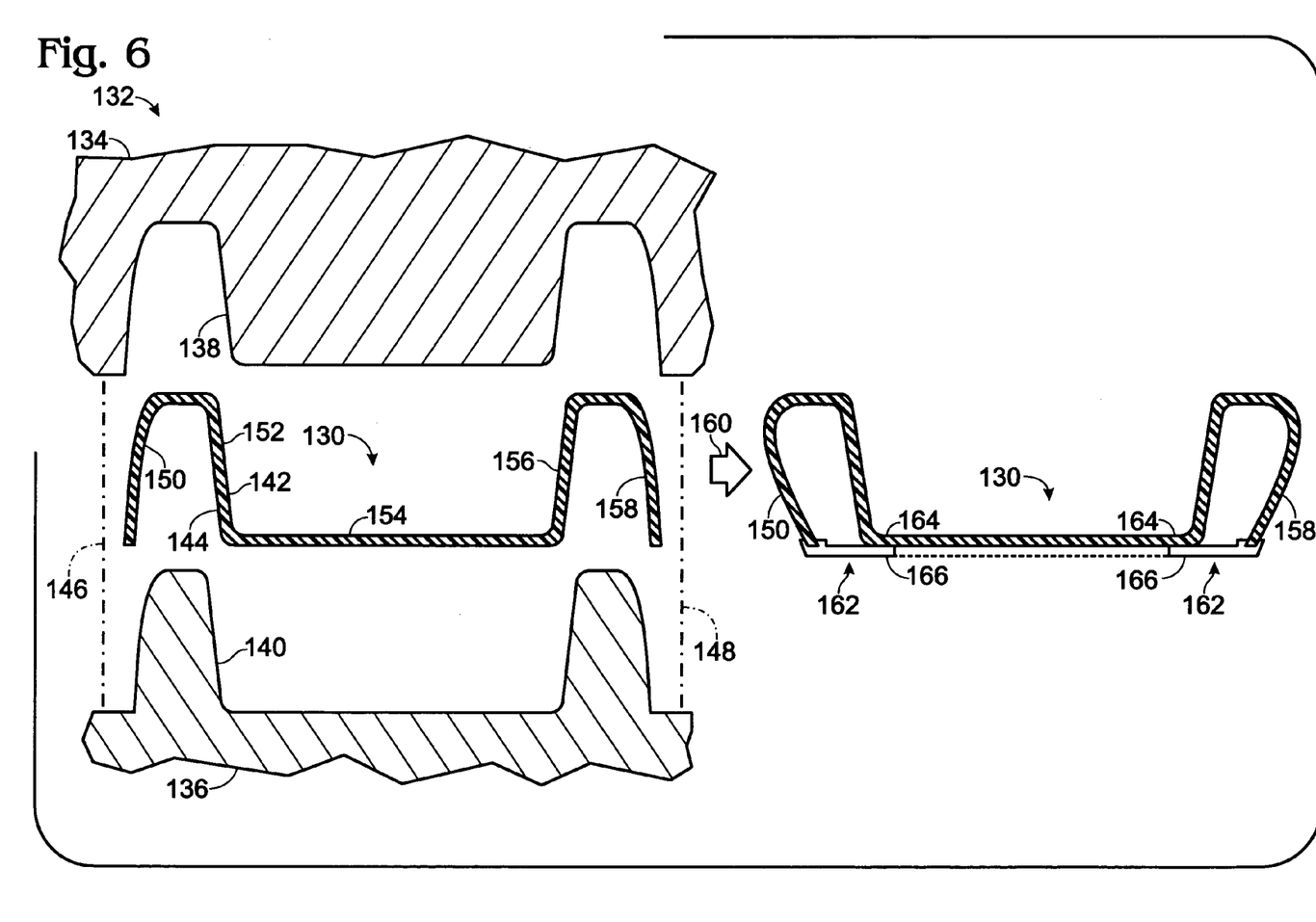
FIG. 6 is a flow diagram illustrating reconfiguration of an illustrative, non-exclusive example of a suitable vehicle body (viewed in cross-section) after the vehicle body is separated from a mold assembly, in accordance with aspects of the present disclosure.

FIG. 6 shows a flow diagram illustrating reconfiguration of an illustrative, non-exclusive example of a body 130 for a children's ride-on vehicle according to the present disclosure. Body 130 is shown here in transverse section and in somewhat schematic form. Furthermore, body 130 is shown as a single body component having a monolithic structure but alternatively may include two or more body components that are connected to one another during and/or after their formation.

The left side of FIG. 6 shows body 130 prior to reconfiguration (i.e., with the body in an unflexed configuration), and after separation from a mold assembly 132 with which the body was molded. The mold assembly may have at least two mold portions, such as mold halves 134, 136 that, when assembled with one another, cooperatively define the size and shape of molded (unflexed) body 130. The mold portions generally are structured to have body-defining surfaces 138, 140 that respectively define the shape of opposing body surfaces 142, 144 of body 130. Furthermore, as described in the Background section, the contours of the body-defining surfaces (and thus the shape of the molded body) are constrained by the need for separation of the mold portions from the body after the body has been formed in the mold assembly. For example, here, the mold portions are drawn apart parallel to draw axes 146, 148, and all of each body surface is oriented within a range of angles (generally, between zero degrees and up to slightly less than 90 degrees) that permit separating motion of the body from the mold portions along the draw axes.

The mold portions may be used to mold body 130 by any suitable process. In some embodiments, the mold portions are used for injection molding of the body. Accordingly, one or more of the mold portions may include one or more entry ports for introduction of fluid body material into mold assembly 132, between the body-defining surfaces, and one or more exit ports or vents to permit outflow of excess fluid body material and/or gas as the mold assembly is being filled and/or as the body material is setting, among others. In other examples, the mold portions may be used to form the body via compression molding, transfer molding, extrusion molding, blow molding, rotational molding, and/or thermoforming, among others. If used to mold a plastic body, the body material may be a thermoplastic material and/or a thermoset material, among others.

Body 130 may include a plurality of distinct body walls, such as walls 150-158, that at least substantially define the body's shape, provide mechanical strength, and/or divide the body into distinct sections or panels. Accordingly, each wall may form a portion of an interior surface or of an exterior surface (or both) of the vehicle.

The right side of FIG. 6 shows body 130 after reconfiguration, indicated by an arrow at 160. The reconfigured body has a shape that is substantially more difficult to mold than the body prior to reconfiguration. Reconfiguration of body 130 may be selective for only a portion(s) of the body. For example, here, walls/panels 150, 158 have been flexed inward in a selective manner. More generally, a body wall may be flexed outward, inward, upward, downward, frontward, backward, and/or a combination thereof, such as to decrease (or increase) a flared configuration of the body, as illustrated here.

Each flexed wall/panel may be held in a flexed configuration by a retainer mechanism 162. The retainer mechanism may extend between and/or engage a flexed wall (150 or 158) and an anchor site 164 of the body and/or vehicle, such as an adjacent flexed or unflexed wall of the body (termed an anchor wall) or a chassis portion of the vehicle, among others. The retainer mechanism may include one or more discrete retainer components, as shown here, and/or at least a portion or all of the retainer mechanism may be formed integrally with the body, such as formed as a projection and/or an opening of the flexed wall and/or the anchor site. In the present illustration, the retainer mechanism includes a linking member 166 that spans a junction or gap between the flexed body wall (150 or 158) and respective anchor site 164. In some embodiments, a single linking member may span a junction or gap between two or more flexed body walls, such as extending from a flexed body wall, past an anchor wall, to another flexed body wall. This is graphically depicted in dashed lines in FIG. 6. In some embodiments, the linking member and the flexed body wall and/or anchor site may have complementary retention structure, such as pins and holes, tabs and slots, and/or the like, that attach the linking member to the flexed wall and/or anchor site without a separate fastener and/or without the need for tools. Alternatively, or in addition, the retainer mechanism may include one or more fasteners (e.g., screws, bolts, nuts, pins, rivets, clamps, wires, etc.). Each fastener may extend from the flexed wall to the anchor site or may engage the linking member and only the flexed wall or only the anchor site. In some cases, the retainer mechanism may be or include an adhesive that directly secures a flexed body wall to an anchor site and/or that directly secures a linking member to the flexed body wall and/or anchor site.

A flexed body panel may have any size that allows the flexed body panel to contribute substantially to the shape of the body. For example, the flexed, or reconfigured, body panel may have a surface area of at least 50, 100, 200, or 300 square inches. In some examples, a flexed body wall or panel of this size may define at least a portion of the external surface of the ride-on's body (i.e., a surface facing generally away from the passenger region of the ride-on vehicle). In other words, the flexed body wall or panel forms a substantial portion of the body and/or the vehicle's exterior (and/or interior) surface and thus is not a discrete flange, tang, pin, tab, or other fastener mechanism that may be utilized in a ride-on vehicle, such as to secure two or more portions of the vehicle together.

The body panel may be integrally formed with other portions of the body. In such an embodiment, the body panel may be described as having a proximate portion, which is connected with another portion of the body, and a distal portion, which extends away from the passenger region of the vehicle and which is engaged by a retainer to secure the body panel in its flexed configuration. As an illustrative, non-exclusive example, the body panel may be integrally formed with a portion of the body that defines the passenger region of the vehicle. If the body includes a monolithic body portion, the flexed body panel may form a portion of the monolithic body portion. The body panel may be retained in its flexed configuration by a retainer, such as by securing the distal portion of the body panel to another portion of the vehicle, such as to a bottom portion, or chassis portion, of the children's ride-on vehicle. Illustrative, non-exclusive examples of portions of the vehicle's body that may form and/or include a flexed body panel according to the present disclosure include a side panel (such as may extend generally between a front and rear wheel of the vehicle), a hood panel, a trunk panel, etc.

In some embodiments, the vehicle body may include two or more body panels that are retained in a flexed configuration by one or more suitable retainers to provide a vehicle with a desired exterior appearance (i.e., a desired exterior shape). As an illustrative, non-exclusive example, a children's ride-n vehicle may include a pair of generally opposed body panels in the form of side panels that are retained in flexed configurations to provide the vehicle's body with an appearance that otherwise would not be available without employing a more complex mold and/or body construction. In some embodiments, the portion of the body containing the one or more flexed body panels may have a configuration having undercuts, or recesses, which cannot be formed with a mold having a pair of mold halves of fixed configuration.

In some embodiments, the vehicle includes a molded plastic body that is created using a corresponding mold, which imposes constraints on the shape of the body. For example, the body and the corresponding mold may be desired to avoid undercut, which refers to projections or other surfaces that obstruct the separation of the mold from the molded body. As discussed, the body may be formed as a unitary structure and/or may include a monolithic portion having front, rear, bottom, and side panels, or portions, that collectively define at least a portion of the vehicle's passenger region. The body may be constructed to overcome the design constraints inherent in a conventional molding process, thereby allowing the side panels of the body to more realistically resemble the side panels of a full-size automobile, such as the illustrative, non-exclusive example of a sports car shown in FIGS. 1 and 2. In other words, the mold used to produce at least a body portion of the body may be designed to produce a ride-on body portion that will have a desired final shape after the one or more body panels are warped or otherwise deformed from their flared (or unflexed) configuration to their flexed configuration.

The body of a ride-on vehicle may be molded with at least one body panel, such as a pair of opposed side panels, having a flared configuration that lacks undercut and thus is compatible with an injection molding (or other suitable) process used to produce the body. After separation from the mold, the side panels (or other one or more body panels) of the body may be urged inward toward the midline of the body, against the bias of the panel, to produce a flexed configuration of the side panels. The majority of each side panel may be repositioned, as the side panel (or other body panel) is flexed inward. Each side panel (or other flexed body panel) may be retained in position (e.g., in a predetermined position or a selectable position) relative to the rest of the body of the vehicle by a retainer, which in some embodiments may take the form of a rocker panel, that engages a lower, or distal, portion of the side panel and which secures the lower portion to retain the panel in its flexed configuration.

During production of the vehicle, the body is formed, such as from a suitable molding process. As an illustrative, non-exclusive example, the body may be formed from molded plastic via an injection molding process. When released from the mold, the one or more body panels will be in an unflexed configuration in which the body has a different configuration, or appearance, than when the vehicle is fully assembled. Described in other terms, the at least one body panel may project outwardly, or away from the passenger region of the vehicle, relative to when the at least one body panel is retained in its flexed configuration. During assembly of the vehicle, the body panel is flexed, or urged against its internal bias, to its flexed configuration. For example, in some embodiments, the distal portion, such as the lower portion, of the body panel may be drawn toward a bottom, or chassis, portion of the ride-on, where the distal portion may be retained in a predetermined configuration by a suitable retainer. The body panel, or at least a flexed portion thereof, may be flexed, or bent at an angle of at least 5° from its unflexed configuration to its flexed configuration. As an illustrative, non-exclusive example, the flexed portion of the panel may be resiliently bent, or flexed, at least 5-90° between its unflexed and flexed configurations. Illustrative subsets of this exemplary range include 10-80°, 5-30°, 15-50°, 20-70°, 40-90°, 50-80°, etc.

FIG. 7 shows vehicle 20 in transverse section, as indicated in FIG. 2, with reconfigured body 22 and front wheels 56, 58 visible. Body 22 includes a monolithic body portion or body component 170 that at least substantially defines passenger region 24 of the vehicle. Here, the body component forms over one-half of the body. In other embodiments, the body component may form any substantial portion (or all) of the body, such as at least about 10%, 20%, 30%, or more of the body. Body component 170 extends in a three-dimensional contour to provide a plurality of distinct body walls, such as a bottom wall 172, a front wall 174, a back wall 176, and left and right side walls 178, 180. These "walls" may additionally or alternatively be referred to as "sections" or "portions" without departing from the scope of the present disclosure.

As graphically depicted in the illustrated example, the side walls generally flank the bottom wall. In the illustrated, non-exclusive example of FIG. 7, each side wall is a multilayer structure that includes an outer side wall portion, or outer side panel, 182 and an inner side wall portion, or inner side panel, 184 that are joined integrally near an upper, or top, region 186 of each panel via a joining region 188. The inner side panel and the outer side panel of each side wall generally face one another and may provide, respectively, an interior surface region of the passenger region and an exterior surface region of the vehicle. In other embodiments, the vehicle may have a left or right side wall of only one layer or of three or more layers. Furthermore, in other examples, the body walls may include a top wall(s) (providing a top panel(s), such as a hood, trunk, or roof of the vehicle, among others), a rear wall(s) (providing a back panel(s), such as a rear interior wall of the passenger compartment, a front or rear wall of the trunk, and/or the back end of the vehicle, among others), a front wall(s) (providing a front panel(s), such as a front interior wall of the passenger compartment or a front exterior wall of the vehicle, among others), and/or the like.

Body 22 is reconfigured from an unflexed configuration, indicated in phantom outline at 190 adjacent reconfigured left and right side portions 42, 44 of the vehicle. In particular, left and right outer side panels 182 are flexed inward in the flexed configuration, generally toward passenger region 24, such that a lower region 192 of each outer side panel moves closer to a bottom portion of body 22, such as closer to a lo lower region 194 of the respective inner side panel 184 and closer to respective lateral regions 196 of bottom wall 172. Any suitable portion of each outer side panel may change shape and/or position between the unflexed and flexed configurations of the body. For example, here, only less than half of the outer side panel is bent or warped in reconfiguring the body, namely, upper region 186 of each outer side panel is selectively bent or warped relative to the rest of the outer side panel. However, a majority of the outer side panel may move relative to the inner side panel and/or relative to the rest of the body when the outer side panel is bent/warped. Accordingly, the exterior shape of the vehicle is changed substantially by reconfiguration of the body because a substantial portion of an exterior surface region 198 of each outer side panel is recontoured and/or repositioned with respect to other portions of the body. Reconfiguration of the body also may bend/warp and reposition each inner side panel, or the contour and position of the inner side panel may remain substantially unchanged, as shown here, by reconfiguration of the body. The body thus includes a pair of opposed flexed body panels in the form of side panels that, in their unflexed configuration, project generally away from each other and the passenger region of the ride-on. When moved to their flexed configurations, the body panels are drawn generally toward each other.

Reconfigured body 22 may be held in a flexed configuration by a distinct retainer mechanism 202 for each flexed side panel. (The retainer mechanism also is shown in an exploded view (in phantom outline) at 204.) Retainer mechanism 202 (see retainer mechanism on the left) includes a linking or spanning member 206, such as a rocker panel 208, and one or more fasteners 210 (such as screws, pegs, pins, bolts, etc.) for fastening the linking member to the body. The linking member may hold lower region 192 of outer side panel 182 at any suitable distance from the remainder of the body component (and/or body), such as in contact with the remainder of the body component or spaced from the body component, as shown here, in a predetermined or selectable (adjustable) spacing.

Figure 8:
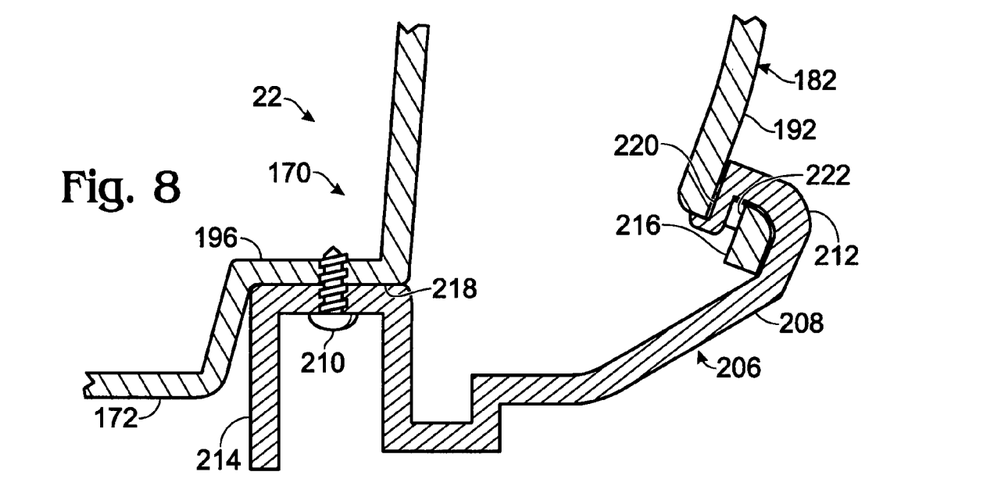
FIG. 8 is a magnified view of the region indicated generally at "8" in FIG. 7.

Regions of the linking member, such as opposing side regions 212 and 214, may be structured to be complementary to regions of the body component (see FIG. 8). For example, here, side region 212 hooks over a flange 216 formed by lower region 192 of outer side panel 182, and side region 214 is disposed in a recess 218 defined by a bottom portion of the body, such as lateral region 196 of bottom wall 172 of the body component. Side region 212 of the linking member also includes retention structure that restricts separation of the side region from outer side panel 182. In particular, the side region includes one or more tabs 220 or other projections that are received in corresponding openings 222 defined by the lower region of the outer side panel, such as openings defined by flange 216 (see FIG. 9 also). Alternatively, or in addition, side region 212 of the linking member may include one or more openings that receive projections defined by the outer side panel.

Figure 9:
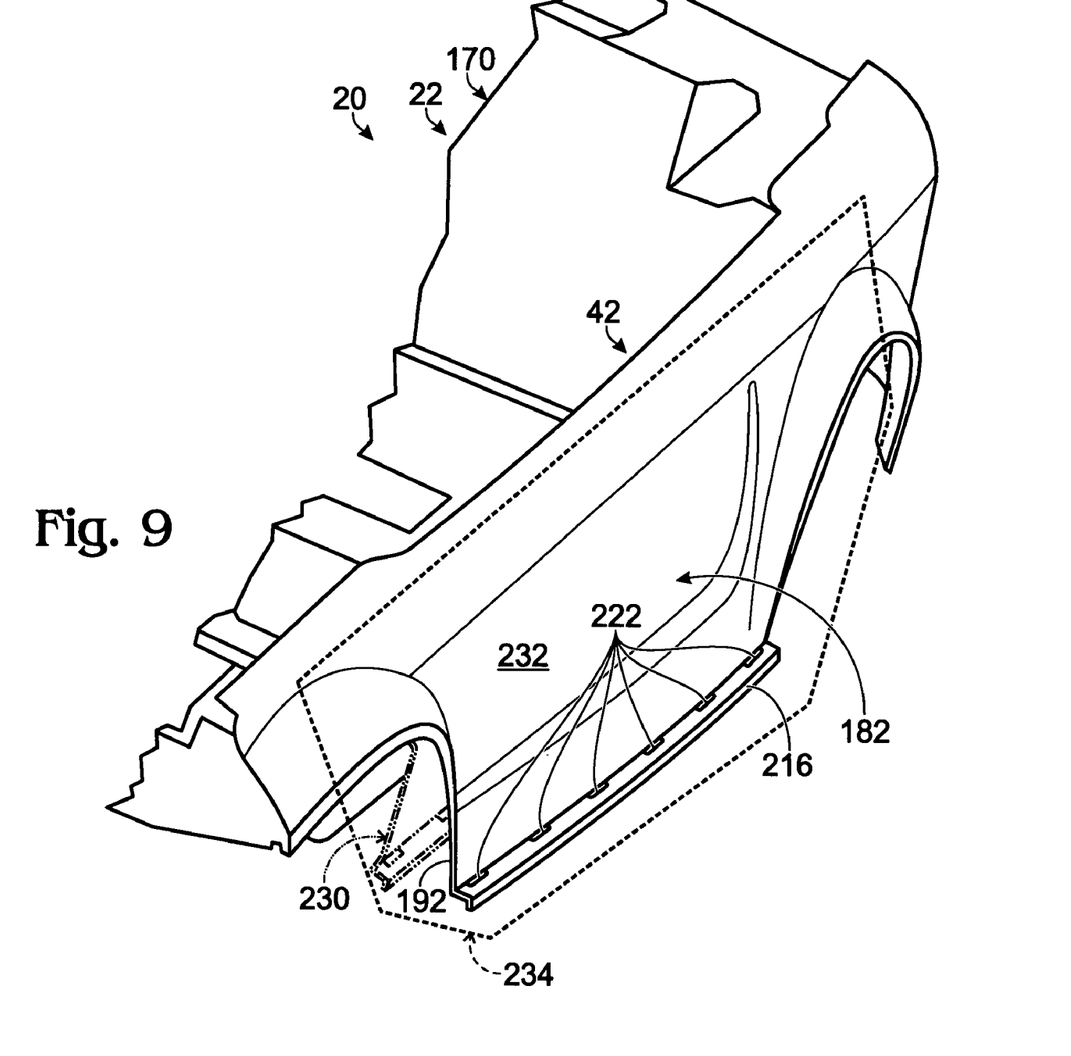
FIG. 9 is a fragmentary, isometric view of a left side portion of the body of the children's ride-on vehicle of FIG. 1, prior to reconfiguration of the body, in accordance with aspects of the present disclosure.

FIG. 9 shows a fragmentary, isometric view of left side portion 42 of body 22, particularly body component 170, of vehicle 20, prior to reconfiguration of the body. The flexed configuration of left side portion 42 is shown in phantom outline at 230 and a portion 232 of the outer side panel that moves during reconfiguration is indicated by a dashed polygon 234 that generally bounds portion 232.) A substantial portion of outer side panel 182 thus moves during reconfiguration.

INDUSTRIAL APPLICABILITY

The present disclosure is applicable to children's ride-on vehicles having a passenger region sized for at least a child driver.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A children's ride-on vehicle, comprising:
a reduced-scale, molded plastic body defining a passenger region sized for a child, the body including a bottom wall and left and right side portions that generally flank the bottom wall, each side portion including an inner side panel and an outer side panel that generally face each other, the body being disposed in a flexed configuration in which a lower region of the inner side panel and a lower region of the outer side panel are retained proximate to one another in each side portion against a bias that urges such lower regions apart from one another;
a plurality of wheels coupled rotatably to the body and including at least one steerable wheel;
a steering mechanism operatively coupled to the at least one steerable wheel and configured to steer the at least one steerable wheel responsive to steering inputs received from a child sitting in the passenger region; and
a drive assembly operatively coupled to one or more of the plurality of wheels and configured to drive the rotation thereof;
wherein the body has an exterior shape that is changed substantially by the flexed configuration relative to an unflexed configuration of the body, such that the ride-on vehicle corresponds more closely in appearance to a selected full-size vehicle with the body in the flexed configuration.

2. The children's ride-on vehicle of claim 1, wherein the plurality of wheel includes front and rear wheels, and wherein the inner and outer side panels of each side portion extend generally between the front and rear wheels.

3. The children's ride-on vehicle of claim 1, further comprising a retainer that engages the lower region of an outer side panel and the bottom wall to retain the lower region of the outer side panel proximate to the bottom wall against a bias that urges the lower region of the outer side panel away from the bottom wall.

4. The children's ride-on vehicle of claim 1, wherein the outer side panel of each side portion has an upper region and a lower region, and wherein the upper region of each outer side panel is warped selectively relative to the lower region of such outer side panel in the flexed configuration.

5. The children's ride-on vehicle of claim 1, wherein the lower region of each outer side panel remains substantially unwarped in the flexed configuration.

6. The children's ride-on vehicle of claim 1, wherein the bottom wall and the left and right side portions are formed integrally with one another in the body.

7. A method of forming a children's ride-on vehicle, comprising:

molding a reduced scale, plastic body defining a passenger region sized for a child, the body including a bottom wall and left and right side portions that generally flank the bottom wall, each side portion including an inner side panel and an outer side panel that generally face each other;

flexing the body, after molding, to a flexed configuration in which a lower region of the outer side panel of each side portion is disposed proximate to a lower region of an inner side panel of such side portion;

retaining the body in the flexed configuration such that the lower regions of the outer and inner side panels in each side portion are retained proximate to one another against a bias that urges such lower regions apart from one another;

coupling a plurality of wheels rotatably to the body, the plurality of wheels including at least one steerable wheel; and coupling a steering assembly operatively to the at least one steerable wheel such that the steering assembly steers the at least one steerable wheel responsive to steering inputs received from a child in the passenger region;

wherein molding includes molding the body with the lower region of each outer side panel having a predefined offset from a position of such lower region in the flexed configuration.

8. The method of claim 7, wherein the step of retaining includes a step of securing the lower region of each outer side panel to the bottom wall using a retainer that engages the bottom wall and the lower region of such outer side panel.

9. The method of claim 7, wherein the step of flexing alters the ride-on vehicle to correspond more closely in appearance to a selected full-size vehicle.

10. The method of claim 7, where each outer side panel has an upper region, and wherein the step of flexing includes a step of selectively flexing the upper region of each outer side panel relative to its lower region such that the outer side panel is flexed by an angle of about 5 to 90 degrees to achieve the flexed configuration.

11. The method of claim 7, wherein the step of flexing includes a step of flexing the outer side panel more than the inner side panel of each side portion.

12. The method of claim 11, wherein the step of flexing includes a step of selectively moving a lower region of the outer side panel relative to an upper region of the outer side panel.

13. The children's ride-on vehicle of claim 1, wherein the outer side panel of each side portion has an upper region and a lower region, and wherein the upper region of each outer side panel is warped more than the lower region of such outer side panel in the flexed configuration.

14. The children's ride-on vehicle of claim 1, wherein the outer side panel of each side portion is warped more than the inner side panel of such side portion in the flexed configuration.

15. A children's ride-on vehicle, comprising:

a reduced-scale, molded plastic body defining a passenger region sized for a child, the body including a bottom wall and left and right side portions that generally flank the bottom wall, each side portion including an inner side panel and an outer side panel that generally face each other, the body being disposed in a flexed configuration in which a lower region of the inner side panel and a lower region of the outer side panel are retained proximate to one another in each side portion against a bias that urges such lower regions apart from one another;

a plurality of wheels coupled rotatably to the body and including at least one steerable wheel;

a steering mechanism operatively coupled to the at least one steerable wheel and configured to steer the at least one steerable wheel responsive to steering inputs received from a child sitting in the passenger region; and a drive assembly operatively coupled to one or more of the plurality of wheels and configured to drive the rotation thereof;

wherein the body is molded with the lower region of each outer side panel having a predefined offset from a position of such lower region in the flexed configuration.

16. The children's ride-on vehicle of claim 15, wherein the plurality of wheels includes front and rear wheels, and wherein the inner and outer side panels of each side portion extend generally between the front and rear wheels.

17. The children's ride-on vehicle of claim 15, further comprising a retainer that engages the lower region of an outer side panel and the bottom wall to retain the lower region of the outer side panel proximate to the bottom wall against a bias that urges the lower region of the outer side panel away from the bottom wall.

18. The children's ride-on vehicle of claim 15, wherein the outer side panel of each side portion has an upper region and a lower region, and wherein the upper region of each outer side panel is warped selectively relative to the lower region of such outer side panel in the flexed configuration.

19. The children's ride-on vehicle of claim 15, wherein the lower region of each outer side panel remains substantially unwarped in the flexed configuration.

20. The children's ride-on vehicle of claim 15, wherein the bottom wall and the left and right side portions are formed integrally with one another in the body.

* * * * *

UNITED STATES PATENT AND TRADEMARK OFFICE
Certificate

Patent No. 7,568,753 B2                                                  Patented: August 4, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Albert L. Arendt, West Seneca, NY (US); John L. Jones, Jr., East Aurora, NY (US); Michael B. Zielinski, West Seneca, NY (US); and Jacob J. Clark, East Aurora, NY (US).

Signed and Sealed this Twenty-fifth Day of December 2012.

<div style="text-align:right">

D. GLENN DAYOAN
*Supervisory Patent Examiner*
Art Unit 3612
Technology Center 3600

</div>